June 24, 1969

J. H. MARTEN 3,451,787

APPARATUS FOR CONDENSATION OF PURE SOLID MELAMINE

Original Filed Feb. 11, 1964

Sheet _1_ of 2

JEROME H. MARTEN
INVENTOR.

BY J. T. Chaboty
AGENT

# United States Patent Office 3,451,787
Patented June 24, 1969

3,451,787
APPARATUS FOR CONDENSATION OF
PURE SOLID MELAMINE
Jerome H. Marten, East Brunswick, N.J., assignor to
Chemical Construction Corporation, New York, N.Y.,
a corporation of Delaware
Original application Feb. 11, 1964, Ser. No. 344,020, now
Patent No. 3,290,308, dated Dec. 6, 1966. Divided and
this application Apr. 29, 1966, Ser. No. 546,408
Int. Cl. B01j 9/04
U.S. Cl. 23—288                                   6 Claims

ABSTRACT OF THE DISCLOSURE

Apparatus is provided for condensation of pure solid melamine from a process gas stream containing melamine vapor. The process gas stream is passed downwards through a vertically oriented vessel provided with an internal substantially horizontal gas baffle which extends inwards from the wall of the vessel and preferably terminates at a central opening, from which a vertical baffle depends downwards to define a restricted gas flow path in which the gas stream is accelerated to high velocity. A layer of insulation is provided on the lower surface of the horizontal baffle and on the outer surface of the vertical baffle, to maintain the baffles at high temperature and prevent deposition of solid melamine. An aqueous quench liquor is projected substantially transversely into the high velocity gas stream below the lower terminus of the vertical baffle, and pure solid melamine free of melamine procursors or decomposition products is condensed into the aqueous liquor. Product pure solid melamine particles are removed from the resulting aqueous slurry.

---

Figure 1:
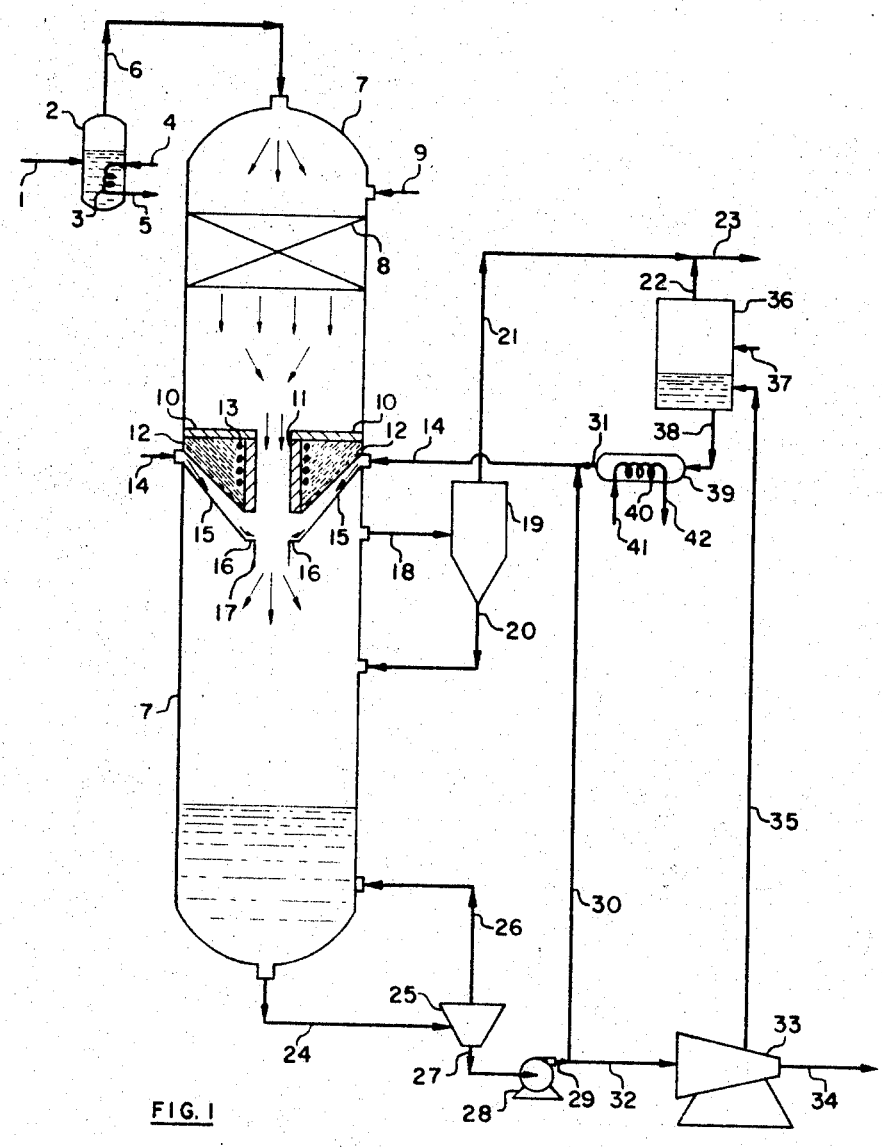

The present case is a division of U.S. patent application Ser. No. 344,020, filed Feb. 11, 1964, and now issued as U.S. Patent No. 3,290,308 on Dec. 6, 1966, and the present invention relates to the synthesis of melamine, by the catalytic conversion of urea. An improved apparatus is provided, which attains the complete conversion of urea and the synthesis of pure melamine without the formation of byproducts or melamine decomposition products.

Melamine is commercially produced from urea by vaporizing molten urea, and passing the resulting urea vapor stream through a catalyst bed at elevated temperature. The urea forms melamine in accordance with the following overall equation:

(1)   $6CO(NH_2)_2 \rightarrow C_3N_6H_6 + 3CO_2 + 6NH_3$

The resulting vapor stream is partially condensed by cooling, to yield crude solid melamine and a mixed ammonia-carbon dioxide off-gas. The melamine produced by this general procedure is impure and must be purified by recrystallization or other means to produce a pure product. Impurities which may be present in the crude melamine include melamine precursors or intermediate compounds such as biuret, ammelide, and ammeline, which may be present in the vapor phase. In addition, melamine decomposition products such as melams may also be present, due to the condensation of solid melamine on hot apparatus surfaces followed by overheating of the solid melamine. Finally, formation of cyanuric acid may take place during this process, which on cooling reverts to urea. Thus, the crude melamine may contain a variety of impurities including urea, melamine precursors, and melamine decomposition products.

In the present invention, melamine is catalytically produced from urea vapor by means of an apparatus which achieves the complete conversion of urea to pure melamine without the concomitant formation of intermediate compounds or melamine decomposition products. Urea vapor is passed through a catalyst bed in the conventional manner at elevated temperature, to produce a hot gas mixture containing melamine, ammonia and carbon dioxide. It has been determined that the formation of intermediate compounds and melamine decomposition products takes place during the conventional procedure of cooling this hot gas mixture to below the sublimation point, which is the temperature below which the melamine vapor condenses as solid melamine. Thus, in the present invention a unique apparatus is provided for cooling the hot gas mixture.

The hot gas mixture is accelerated in velocity by means of a flow restriction gas baffle which is maintained at a temperature above the sublimation point, so that deposition of solid melamine on the gas baffle cannot occur. The gas mixture is passed downwards through the baffle, and the resulting downflowing highly accelerated gas mixture is suddenly quenched by projecting a cold stream of aqueous quench liquor transversely into the mixture. The melamine component of the gas mixture is thus completely and rapidly condensed into the liquid phase as pure solid melamine, while the stable formation of intermediate compounds or melamine decomposition products is completely prevented.

A unique sequence and apparatus is also provided for the transverse projection of the aqueous quench liquor. The accelerated gas mixture is preferably discharged downwards into a fluid passage defined by a baffle having downwardly converging side walls and terminating at a lower outlet having substantially horizontal projection lips. The aqueous quench liquor is dispersed onto the upper surface of the downwardly converging side walls and thereafter flows downward and is projected transversely into the gas stream by the horizontal projection lips. An immediate and substantially complete quench of the hot gas mixture is thus attained, while completely avoiding the deposition of solid melamine on any of the baffle surface.

The apparatus of the present invention provides unique advantages. Melamine is produced as a pure solid product, free of impurities and directly suitable for product usage in plastics manufacture or for other purposes. The quench sequence of the present invention permits the usage of a high temperature vapor phase catalytic process, thus the complete conversion of urea is attained and recrystallization of the product melamine with recovery and recycle of unconverted urea is obviated. The decomposition of melamine to form solid melams is completely prevented. The apparatus of the present invention is comparatively simple to fabricate and install, and provides continuous operation of the process without the necessity of shutdowns for cleaning and removal of solid blockages as is common in the prior art.

It is an object of the present invention to produce melamine in an improved manner.

Another object is to provide an apparatus for the production of pure melamine.

A further object is to prevent the formation of intermediate compounds and decomposition products during the production of melamine from urea.

An additional object is to quench the hot gas mixture derived from the catalytic conversion of urea vapor to melamine in an improved manner.

Still another object is to provide an apparatus for the high temperature vapor phase catalytic conversion of urea vapor to melamine with subsequent condensation of pure solid melamine.

These and other objects and advantages of the present invention will become evident from the description which follows. Referring to the figures, FIGURE 1 is an overall flow diagram of the catalytic urea conversion and gas quench procedure of the present invention, including recovery of pure solid melamine and recycle of aqueous quench liquor, and FIGURE 2 is an isometric diagram of the novel gas baffle and quench apparatus of the present invention.

Figure 2:
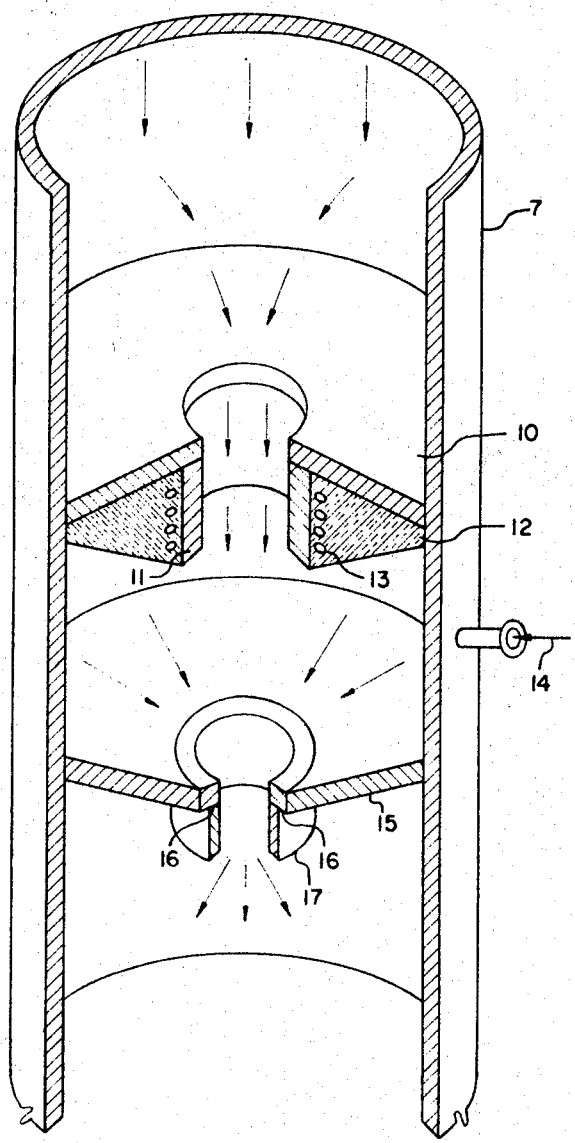

Referring to FIGURE 1, solid or molten liquid urea is passed via 1 into urea vaporizer 2. In unit 2, the urea is vaporized in a conventional manner with heating fluid being admitted to coil 3 via 4 and discharged via 5. The vaporized urea stream 6 is withdrawn from unit 2, preferably at a temperature in the range of 650° F. to 800° F., and is passed to melamine synthesis and gas quench converter 7. An upper temperature limit of 800° F. is generally preferable, in order to avoid ammonia loss due to decomposition at more highly elevated temperatures. The lower temperature limit of 650° F. is also generally preferable, due to diminished catalytic activity in melamine synthesis at lower temperatures. It will be appreciated, however, that an operating temperature outside these ranges is feasible in practice and could be employed if desired. Due to the heating and vaporization of urea in unit 2, stream 6 will contain urea decomposition products and melamine precursors such as cyanuric acid, biuret, ammeline and ammelide, as well as ammonia, carbon dioxide and vaporized urea.

Unit 7 is preferably a vertically oriented cylindrical vessel, and will be considered infra as of this physical configuration. The hot gas stream 6 is passed into the upper portion of unit 7, above catalyst bed 8 in which the catalytic conversion to melamine of urea and melamine precursors in the hot gas stream 6 takes place. Bed 8 contains a conventional melamine synthesis catalyst, such as boron phosphate, alumina gel or silica gel. Other known melamine synthesis catalysts may be employed in bed 8. Gas stream 9 consisting of ammonia vapor is preferably also admitted to unit 7 above bed 8, in order to moderate the initial catalytic conversion reaction which rapidly takes place in the upper portion of bed 8. This reaction is exothermic, and the excess ammonia admitted via 9 acts as a diluent and cooling agent to prevent overheating. In addition, the presence of excess ammonia in the process stream is desirable in that subsequent formation of melams at a later stage of the process is thereby inhibited.

The converted gas mixture now passes downwards from bed 8, and contains melamine vapor, ammonia and carbon dioxide. The gas mixture is now preferably at a temperature in the range of 650° F. to 800° F., for reasons discussed supra, and in any event must be kept at a temperature of above 610° F., which is the melamine sublimation point, in order to prevent the condensation and deposition of solid melamine on internal surfaces with concomitant decomposition of the melamine to form melams. The downflowing hot gas mixture is now centrally diverted by horizontal gas baffle 10, which is disc-shaped with a circular central opening. A vertical cylindrical gas baffle 11 extends downwards from the central opening of baffle 10, so as to direct the hot gas mixture into a downwardly accelerated flow path. Baffles 10 and 11 are preferably provided with insulation 12 on their lower and outer surfaces respectively, in order to maintain the opposite surfaces of the baffles at an elevated temperature above 610° F. thereby preventing the deposition of solid melamine on the exposed baffle surfaces. In addition, heating coils 13 may be provided adjacent to the outer surface of baffle 11, in order to provide additional heating of baffle 11 is required. Coils 13 may consist of heat exchange tubes in which a heat exchange fluid such as Dowtherm is circulated, however coils 13 will preferably consist of an electric resistor heating element.

The hot gas mixture now passes downward from the outlet of cylindrical baffle 11 at high velocity, and is quench-cooled by aqueous quench liquor which is transversely projected into the hot gas mixture, so as to deposit all of the melamine content in the liquid phase as pure solid melamine, free of impurities such as melamine precursors and melamine decomposition or polymerization products. The aqueous quench liquor stream 14 contains equilibrium amounts of dissolved ammonia, carbon dioxide and melamine, and is preferably transversely projected into the hot gas mixture by the provision of a funnel-shaped fluid passage below the baffle 11, defined by downwardly converging side wall 15. The aqueous quench liquor stream 14 is preferably at a temperature in the range of 150° F. to 170° F., and preferably contains in the range of 1% to 10% solid melamine which aids in the subsequent deposition of solid melamine from the gas phase during the quench cooling. Stream 14 is dispersed on the upper surface of side walls 15, and flows downward for transverse projection into the hot gas stream. This is attained by the provision of substantially horizontal projection lips 16 at the lower end of walls 15. Lips 16 define the outlet of the funnel-shaped fluid passage and serve to project the downflowing aqueous quench liquor transversely into the hot gas mixture. A lower cylindrical extension baffle 17 may be provided below lips 16, so as to assure complete attainment of gas-liquor equilibrium. Baffle 17 may be omitted in some cases, depending on process conditions empirically established in practice.

The gas-liquor mixture now passes downward from baffle 17 and enters the lower portion of unit 7, in which the mixture separates into a residual gas phase consisting of ammonia-carbon dioxide off-gas and a liquid slurry consisting of pure solid melamine in aqueous liquor. The off-gas stream 18 passes into entrainment separator 19, which is a gas-liquid separator of conventional design such as a cyclonic-shaped vessel. Entrained liquid is separated from the gas phase and recycled via 20 to unit 7, while the off-gas is removed via 21. Stream 21 is combined with a similar off-gas stream 22, derived in a manner to be described infra, to form total melamine synthesis off-gas stream 23. The total off-gas stream 23 is passed to further utilization, such as reaction with nitric acid to form ammonium nitrate fertilizer. Other utilization of the off-gas such as in the manufacture of urea as described in U.S. patent application Ser. No. 264,637, filed Mar. 12, 1963, and issued Mar. 8, 1966, as U.S. Patent No. 3,239,522, may also be adopted.

The liquid slurry collects in the bottom of unit 7, preferably at a temperature in the range of 170° F. to 190° F., is withdrawn as liquid slurry stream 24 and processed in a conventional manner to produce pure solid melamine and recycle aqueous quench liquor. Thus, stream 24 is initially passed to hydroclone 25, which is an apparatus for separating the liquid slurry into a concentrated slurry high in solids and a dilute liquid phase deficient in solid melamine. The dilute liquid phase is recycled via 26 from unit 25 to unit 7, to provide agitation and dilution in the pool of liquid slurry which collects in the bottom of unit 7.

The concentrated slurry is withdrawn via 27 and is pumped via slurry pump 28 to form slurry discharge stream 29 at an elevated pressure in the range of 20 p.s.i.g. to 50 p.s.i.g. The pressure of the slurry is thus raised prior to separation of pure solid melamine in order to prevent the evolution of ammonia gas during solids separation. A small portion of stream 29 is preferably recycled via 30, to combine with recycle cold aqueous quench liquor stream 31 and form aqueous quench liquor stream 14 with a solids content in the preferable range of 1% to 10% solids. It will be appreciated that stream 30 may be omitted if desired, in which case stream 14 would consist solely of a liquid solution free of solids. The balance of stream 29 is passed via 32 to centrifuge 33, which operates under a pressure in the range of 20 to 50 p.s.i.g. and is a conventional device for separating slurries into solid and liquid phases. The pure solid melamine product is withdrawn from unit 33 via 34, and passed to product utilization after drying, not shown.

The separated liquid phase is withdrawn from unit 33 via stream 35, and is recycled for further utilization as aqueous quench liquor. Stream 35 is passed to hold tank 36, in which an inventory of quench liquor is maintained to compensate for process surges. Makeup water stream 37 is added to tank 36 to compensate for water vapor which is removed from the system via melamine off-gas stream 23. In addition, if desired, a portion of dissolved ammonia and carbon dioxide can be evolved from the liquid phase in tank 36. The evolved off-gas is removed from tank 36 via stream 22, for utilization as described supra. Aqueous quench liquor is withdrawn from tank 36 via stream 38, and is passed through cooler 39 which is provided with cooling coil 40. Cold water stream 41 is passed into coil 40, and warmed water is removed via stream 42. The cooled aqueous quench liquor is removed moved from cooler 39 as stream 31 at a temperature preferably in the range of 160° F. to 170° F., and is recycled to quench the hot gas mixture as described supra.

Referring now to FIGURE 2, the unique apparatus for quenching the hot melamine-containing gas mixture is shown in detail, in an isometric view. Thus, the portion of unit 7 below the conventional catalyst bed and above the lower liquid slurry outlet pool is shown in enlarged scale. The hot gas mixture passes downward in unit 7 and is diverted inwards by horizontal disc-shaped baffle 10, thence downwards through the central opening in baffle 10. The gas mixture next passes downwards at accelerated velocity through vertical cylindrical baffle 11. The aqueous quench liquor stream 14 is dispersed onto the upper surface of funnel-shaped baffle 15 and flows centrally downwards across the inclined surface. The aqueous quench liquor is projected transversely into the accelerated hot gas mixture by horizontal projection lips 16, and the resultant gas-liquid mixture passes via cylindrical baffle 17 to the balance of the system.

Numerous alternatives within the scope of the present invention will occur to those skilled in the art. Thus for example, vessel 7 may alternatively be provided with a square or rectangular cross-section, for ease of fabrication. In this case the flow passages defined by the central opening in baffle 10, baffle 11 and the lips 16 would be in the form of slots rather than circular passages. This alternative is relatively less desirable due to the possibility of solids buildup at the ends of the slots.

Although baffle 10 is shown as a horizontal element, it will be evident that baffle 10 may alternatively be inclined somewhat in practice so as to provide less turbulence in the flow of the hot gas mixture to the central opening.

The funnel-shaped fluid passage defined by inclined baffle 15 and lips 16 for transverse projection of aqueous quench liquor stream 14 into the hot gas mixture is merely a preferred embodiment, and represents the best mode of transverse projection of the quench liquor. Alternative means may be adopted for this purpose, such as a plurality of horizontal quench nozzles radially disposed in a perimeter about the outet of cylindrical baffle 11. This apparatus combination is relatively less desirable, due to the possibility of deposition of solids on the projection nozzles, leading to the possible decomposition of melamine with the formation of melams.

Finally, the catalyst bed 8 is shown as a single bed, with injection of ammonia vapor via 9 above the bed to moderate the catalytic reaction. It is alternatively feasible to provide a plurality of smaller catalyst beds in series, with injection of ammonia vapor above each bed. In this manner the catalytic reaction may be more uniformly moderated, with maintenance of a uniform temperature level throughout the several catalyst beds.

Depending on the operating temperature of the hot gas mixture discharged from catalyst bed 8, in some cases it will be possible to maintain the exposed surfaces of baffles 10 and 11 at an elevated temperature above 610° F., without the provision of insulation 12 and heating element 13. In this case the deposition of solid melamine on the baffles would be inherently prevented. This alternative is not advisable in most cases, since provision of the hot gas mixture at a highly elevated temperature will necessitate the provision of an excessive amount and circulation of aqueous quench liquor, in order to provide an effective quench of the hot gas mixture.

An example of an industrial application of the present invention will now be described. In the example infra, all flow quantities are expressed in pounds per hour.

EXAMPLE

A molten liquid urea feed stream was vaporized at the rate of 790 pounds per hour, with 583.8 ammonia gas being passed into the vaporizer at 560° F. and 35 p.s.i.g. to combine with the urea vapor thereby aiding in vaporization and providing excess ammonia in the urea vapor stream. The resultant ammonia-urea vapor stream was produced at 752° F. and 25 p.s.i.g. and the urea component was concomitantly partially reacted to form cyanuric acid and melamine due to noncatalytic thermal reaction. Thus, the vapor stream passed to the boron phosphate catalyst fed for melamine synthesis contained 807.2 ammonia, 132.2 carbon dioxide, 307.9 cyanuric acid, and 126.5 melamine. In addition 601.2 ammonia gas at a temperature of 350° F. was sparged into the top of the catalyst bed, to moderate the melamine synthesis reaction. The catalytic reaction was thus maintained essentially isothermal, and a hot gas mixture containing melamine, ammonia and carbon dioxide was produced at 752° F.

The hot gas mixture was quenched in accordance with the present invention, using an aqueous quench liquid at 156° F. containing 8926.5 water, 3550.5 dissolved ammonia, and 2765.0 dissolved carbon dioxide. The aqueous quench liquor also contained a small equilibrium amount of melamine, dissolved in the liquid phase. The gas-liquid mixture derived from the quench step was separated itno a mixed off-gas containing 1427.9 ammonia, 314.8 carbon dioxide and 286.7 water vapor, and a liquid slurry containing pure solid melamine at 175° F. and 15 p.s.i.g. A slurry feed was thus pumped to the product centrifuge at 175° F. and 40 p.s.i.g., and contained 8684.5 water, 3550.5 ammonia, 2765.0 carbon dioxide and 253.0 melamine. A product melamine wash stream consisting of 25.3 water was also passed to the product centrifuge. The solids discharge from the centrifuge consisted of 253.0 pure solid melamine and 5.1 water. This product stream was passed to a dryer to produce dry pure solid melamine.

The liquid phase derived from the centrifuge at 175° F. consisted of 8704.7 water, 3550.5 ammonia and 2765.0 carbon dioxide. This liquid stream was passed to the aqueous mother liquor hold-up tank, together with 204.7 make-up water to compensate for water loss from the system in the mixed off-gas and product melamine streams. An aqueous quench liquor stream withdrawn from the hold-up tank contained 8926.5 water, 3550.5 ammonia and 2765.0 carbon dioxide. This quench liquor stream was cooled to 156° F. and recycled to the quenching of the hot gas mixture.

The gas baffles employed to divert the hot gas mixture were provided with insulation and an electric resistor heating element. The baffle surfaces were thus maintained at 654° F. The quench step was carried out by provision of the funnel-shaped fluid passage baffle provided with horizontal projection lips, as described supra.

I claim:

1. Apparatus for condensation of pure solid melamine from a hot gas mixture derived from the catalytic conversion of vaporized urea and containing melamine, ammonia and carbon dioxide which comprises a vertically oriented condenser vessel, means to pass said hot gas mixture into the upper portion of said vessel whereby said hot gas mixture flows downwardly in said vessel, a horizontal gas baffle extending inwards from the wall of said vessel to define a downwardly restricted flow path for said gas mixture, whereby said gas mixture is accelerated in velocity, a vertical gas baffle extending downwards from the inner edge of said horizontal gas baffle whereby said gas mixture is conducted in a narrow downwards flow path, the lower surface of said horizontal gas baffle and the outer surface of said vertical gas baffle being provided with a layer of insulation whereby said gas baffles are maintained at a temperature above the sublimation point of melamine, means below said vertical gas baffle to project aqueous quench liquor substantially transverse to the downflowing gas stream, whereby said gas stream is quenched without deposition of solid melamine on said gas baffles and the melamine content of said gas stream is deposited in said aqueous quench liquor as pure solid melamine, means to separate residual off-gas comprising ammonia and carbon dioxide from the resulting liquid slurry containing pure solid melamine, means to separate the product pure solid melamine from aqueous quench liquor, and means to cool and recycle said aqueous quench liquor to said transverse quench of said hot gas mixture.

2. Apparatus of claim 1, in which said vertical gas baffle is provided with heating means on its external surface, to maintain said vertical gas baffle at a temperature above the sublimation point of melamine.

3. Apparatus of claim 2, in which said heating means comprises an electric resistor element.

4. Apparatus of claim 2, in which said means to project aqueous quench liquor substantially transverse to the downflowing gas stream comprises an inclined fluid passage baffle below said vertical gas baffle, said fluid passage baffle having downwardly converging side walls terminating at a lower outlet disposed below the gas discharge outlet of said vertical gas baffle, the lower outlet of said fluid passage baffle being defined by substantially horizontal projection lips, together with means to disperse aqueous quench liquor on the upper surface of said fluid passage baffle, whereby the aqueous quench liquor flows downward on said fluid passage baffle and is transversely projected into said hot gas mixture by said projection lips.

5. Apparatus of claim 4, in which said vertically oriented condenser vessel is cylindrical, said horizontal gas baffle is disc-shaped with a round central outlet, said vertical gas baffle is cylindrical and said fluid passage baffle is funnel-shaped.

6. Apparatus for production of pure solid melamine from urea vapor which comprises a vertically oriented cylindrical vessel, a catalyst bed disposed in the upper part of said vessel, means to pass urea vapor into said vessel above said catalyst bed, whereby said urea vapor passes downwards through said catalyst bed to form a hot gas mixture containing melamine, ammonia and carbon dioxide, a horizontal gas baffle below said catalyst bed, said horizontal gas baffle extending inward from the wall of said vessel and being disc-shaped with a circular central opening, a cylindrical vertical gas baffle extending downwards from the inner edge of said horizontal gas baffle, the lower surface of said horizontal gas baffle and the outer surface of said vertical gas baffle being provided with insulation, the outer surface of said vertical gas baffle also having a juxtaposed electric resistor heating element, said insulation and said heating element serving to maintain the exposed surfaces of said baffles in contact with said gas mixture at a temperature above the sublimation point of melamine, an inclined funnel-shaped fluid passage baffle below said vertical gas baffle, said fluid passage baffle having downwardly converging side walls terminating at a central lower outlet disposed below the gas discharge outlet of said vertical gas baffle, the lower outlet of said fluid passage baffle being defined by substantially horizontal projection lips, means to disperse aqueous quench liquor on the upper surface of said fluid passage baffle, whereby the aqueous quench liquor flows downward on said fluid passage baffle and is transversely projected into said hot gas mixture by said projection lips, thereby quenching said hot gas mixture without deposition of solid melamine on said gas baffles and condensing the melamine content of said gas mixture into said aqueous quench liquor as pure solid melamine, means to separate residual off-gas comprising ammonia and carbon dioxide from the resulting liquid slurry containing pure solid melamine, means to separate the product pure solid melamine from aqueous quench liquor, and means to cool and recycle said aqueous quench liquor to said transverse quench of said hot gas mixture.

References Cited

UNITED STATES PATENTS

| | | |
|---|---|---|
| 2,890,999 | 6/1959 | Polack _____ 23—284 X |
| 3,057,700 | 10/1962 | Gross. |
| 3,116,348 | 12/1963 | Walker. |
| 3,132,143 | 5/1964 | Fogagnolo et al. |
| 3,310,558 | 3/1967 | Oele et al. |

JOSEPH SCOVRONEK, *Primary Examiner.*

U.S. Cl. X.R.

23—284; 261—118, 157